United States Patent
Schieve et al.

(10) Patent No.: US 6,212,651 B1
(45) Date of Patent: Apr. 3, 2001

(54) COMPUTER SYSTEM HAVING AN INSTRUCTION INTERCEPTION AND SUBSTITUTION CIRCUIT

(75) Inventors: Eric W. Schieve; Gary W. Abbott, both of Austin, TX (US)

(73) Assignee: Dell USA L.P., Austin, TX (US)

( * ) Notice: Subject to any disclaimer, the term of this patent is extended or adjusted under 35 U.S.C. 154(b) by 1007 days.

(21) Appl. No.: 08/590,049

(22) Filed: Jan. 3, 1996

Related U.S. Application Data

(63) Continuation of application No. 08/085,699, filed on Jun. 30, 1993.

(51) Int. Cl.$^7$ ...................................................... H02H 3/05
(52) U.S. Cl. .............................................. 714/36; 714/35
(58) Field of Search ........................ 395/183.12, 183.11; 714/36, 35, 25, 46

(56) References Cited

U.S. PATENT DOCUMENTS

| | | | |
|---|---|---|---|
| 3,688,263 | * | 8/1972 | Balogh .............................. 371/16.1 X |
| 4,355,389 | * | 10/1982 | Sato ........................................ 371/18 |
| 4,553,201 | * | 11/1985 | Pollack ............................ 371/16.1 X |
| 4,683,568 | * | 7/1987 | Urban .............................. 371/16.1 X |
| 4,727,549 | * | 2/1988 | Tulpule ................................. 371/62 |
| 4,885,683 | * | 12/1989 | Coogan ............................ 371/16.1 X |
| 4,953,165 | * | 8/1990 | Jackson ............................... 371/16.1 |
| 5,245,615 | * | 9/1993 | Treu ..................................... 371/16.5 |
| 5,327,435 | * | 7/1994 | Warchol .............................. 371/16.1 |
| 5,398,333 | * | 3/1995 | Schieve .......................... 395/183.12 |
| 5,491,790 | * | 2/1996 | Keeley ........................... 395/183.12 |

* cited by examiner

Primary Examiner—Dieu-Minh T. Le

(57) ABSTRACT

Disclosed are a system and method for providing fault isolation in a computer system including a central processing unit ("CPU") capable of issuing a signal to a memory to retrieve a requested instruction from the memory when the CPU is booted. The disclosed invention comprises an interception and substitution circuit, coupled to the CPU, capable of intercepting the signal and providing an alternative diagnostics instruction to the CPU in lieu of the requested instruction, the alternative diagnostics instruction providing an indication of proper functioning of the computer system when executed by the CPU. The circuit allows a user to determine whether the CPU and components proximate the CPU are functioning, even when a fault renders conventional, embedded power-on self-test routines non-functional.

33 Claims, 2 Drawing Sheets

COMPUTER SYSTEM HAVING AN INSTRUCTION INTERCEPTION AND SUBSTITUTION CIRCUIT

This application is a continuation of Ser. No. 08/085,699, Jun. 30, 1993.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright protection whatsoever.

TECHNICAL FIELD OF THE INVENTION

The present invention is directed in general to diagnostics for a computer and, more specifically, to a circuit proximate a central processing unit ("CPU") in the computer capable of localizing faults to within a region surrounding the CPU.

BACKGROUND OF THE INVENTION

Diagnostics routines consist of a series of instructions executed by the CPU within the computer system to allow self-diagnosis. For years, computers have been provided with diagnostic routines that test and report on the operational status or functionality of components within the computer, allowing an interested party to repair or replace components that are not functioning to the desired degree.

Diagnostics code is sometimes stored on disk and retrieved therefrom for execution by the CPU. One advantage of disk-based diagnostics is that disks provide a relatively large area in which to store code, allowing diagnostics routines to be relatively sophisticated and thorough in their testing and reporting. Unfortunately, diagnostics routines are frequently invoked when components in the computer are not completely functional. To successfully retrieve and execute disk-based diagnostics, the following components must be fully functional: CPU, address and data buses, bus controller, disk drive controller, disk drive and keyboard. If any significant information is to be relayed back to the user, a display device or a printer and their associated interface hardware must also be fully functional. It is apparent therefore that if any one of these components is not fully functional, the diagnostics may not execute or interact with the user properly.

One solution to the above-noted problem with disk-based diagnostics was solved in part by embedding diagnostics code in solid state memory within the computer. Thus, read-only memory ("ROM"), for instance, was employed to store diagnostics as firmware. One type of embedded diagnostics is power-on self-test ("POST") diagnostics, generally stored in basic input-output system ("BIOS") ROM in personal computers. POST is a series of tests that the computer performs on its components each time the computer is turned on. POST begins by reading system configuration information that has either been hard-wired or stored in non-volatile memory. It then checks random access memory ("RAM") by writing to and reading from the RAM to ensure proper operation. POST next examines the disk drives to confirm that they match the system configuration information. Lastly, POST initiates the loading of the operating system, "booting" the computer. Failure during execution of POST isolates the fault area for proper diagnosis. Each phase of the POST routine involves a check of the computer systems major components: the memory, hard-disk drive, diskette drive and operating system.

In contrast to disk-based diagnostics, embedded (or ROM-based) diagnostics require the following components to function: CPU, address and data buses, bus controller and keyboard. Again, if any significant information is to be relayed back to the user, a display device or printer and their associated interface hardware must also be fully functional. Although ROM-based diagnostics are typically required to fit within a smaller space and therefore do not have the luxury of being as thorough as disk-based diagnostics, it is apparent that fewer components need be functional to successfully retrieve and execute embedded diagnostics.

As will be more thoroughly described later, personal computers have a unique bus structure comprising a relatively fast "host" bus that directly connects the CPU and system RAM. A slower input/output ("I/O") bus provides a connection to BIOS ROM and peripheral interfaces (or "slots") that, in typical IBM-compatible personal computers are of an extended industry-standard architecture ("EISA"), allowing peripheral cards to be inserted into the slots to add function to the system. A bus controller joins the host and I/O buses together to allow communication therebetween. The bus controller typically contains interface logic allowing the host and I/O buses to trade data back and forth despite speed differences. The bus controller also contains bus controller memory, usually ROM, that stores data used in conjunction with the interface logic to allow communication between the two buses.

Since the CPU and BIOS ROM are coupled to the host and I/O buses, respectively, retrieval of ROM-based POST diagnostics depends on the full functioning of both buses. If the computer fails to retrieve POST diagnostics, the user must assume that a problem exists either in the CPU, the host or I/O buses, the bus controller, the ROM BIOS, any one of the EISA slots or in the display and its associated interface hardware. Therefore, even ROM-based diagnostics are unable to localize problems to a fewer number of components than this if they cannot be successfully retrieved for execution. (The ability of diagnostics to localize or isolate faults can be thought of as its "resolution," a higher resolution being desirable for obvious reasons.)

The issue of minimizing the number of components required to retrieve and execute diagnostics is not merely theoretical. In practice, EISA peripheral cards introduce many opportunities for faults to occur. These cards are complex, containing many devices per card. Furthermore, these cards reside in physically long slots containing many electrical connections. Failure of any one of the devices on any one of the cards or a fault occurring in any one of the slots can short circuit the I/O bus, potentially completely disabling it. In addition, failure of the BIOS ROM can render POST unloadable and therefore nonexecutable.

Thus, a problem arises when BIOS POST is not available to diagnose the computer. Clearly, there exists a need in the art to more locally diagnose faults in a computer when BIOS POST is unable to load for execution, namely, when a fault prevents the CPU from retrieving POST instructions from ROM.

SUMMARY OF THE INVENTION

It is therefor a primary object of the present invention to provide a means by which to test the functionality of the CPU and components immediately surrounding the CPU to determine whether the CPU and those components are functioning. If the CPU and those components are functioning and BIOS POST is still nonfunctional, the problem exists in the I/O bus or its attachments. If, on the other hand, the present invention determines that the CPU and the immediately surrounding components are not functioning, the problem has been sufficiently localized to allow replacement of a relatively few number of components.

In the attainment of the above-noted primary object, the present invention provides, in a computer system including a CPU capable of issuing a signal to a memory to retrieve a requested instruction from the memory when the CPU is booted, an interception and substitution circuit, coupled to the CPU, capable of intercepting the signal and providing an alternative instruction to the CPU in lieu of the requested instruction, the alternative instruction providing an indication of proper functioning of the computer system when executed by the CPU. The present invention locates the interception and substitution circuit within the bus controller, the bus controller coupled to the CPU via a host bus and coupled to the memory via an I/O bus, the bus controller managing communication of address and data signals between the host bus and the I/O bus.

It is another object of the invention to provide a simple means by which to indicate to a user whether or not the CPU is functioning to eliminate a need for a display and its associated interface hardware and to minimize hardware requirements. Therefore, in a preferred embodiment of the present invention, an externally-readable indicator is coupled to the CPU via an indicator port and the host bus, allowing the CPU to provide signals to an externally-readable indicator coupled to the indicator port. A preferred embodiment of the present invention also includes a reset circuit coupled to the CPU and capable of causing the CPU to boot.

Once the interception and substitution circuit has provided its substituted alternative diagnostic instruction to the CPU, the circuit goes dormant, allowing the CPU to proceed by retrieving subsequent instructions from POST ROM, thus continuing its boot procedure. The operation of the circuit is designed to be transparent to the CPU, not only while it is functioning, but also after it becomes dormant.

The foregoing has outlined rather broadly the features and technical advantages of the present invention so the detailed description of the invention that follows may be better understood. Additional features and advantages of the invention will be described hereinafter which form the subject of the claims of the invention. Those skilled in the art should appreciate that the conception and the specific embodiment disclosed may be readily utilized as a basis for modifying or designing other structures for carrying out the same purposes of the present invention. Those skilled in the art should also understand that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
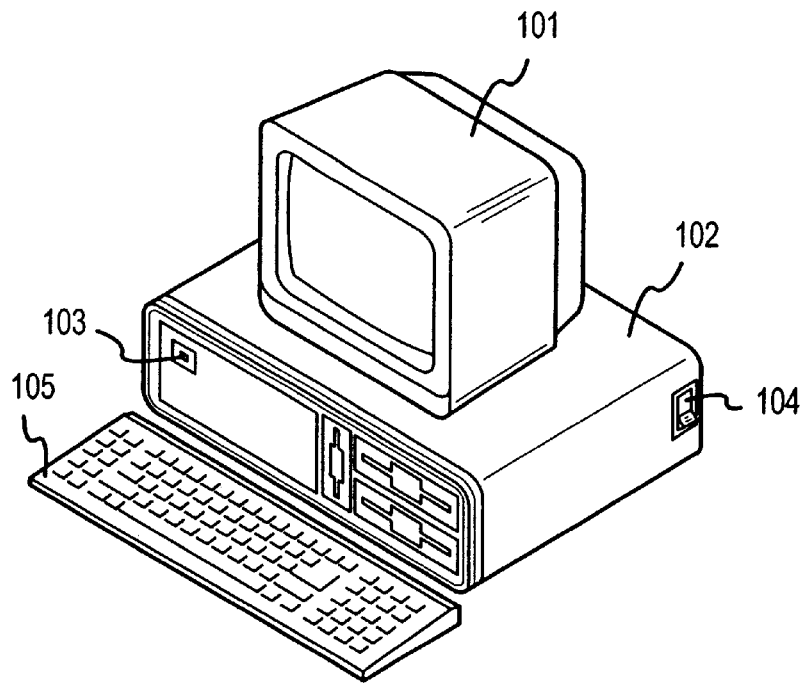
FIG. 1 illustrates an isometric view of personal computer.

FIG. 1 illustrates an isometric view of a personal computer 102 embodying the present invention. The computer 102 is coupled to a monitor 101 and a keyboard 105. As has been introduced previously and will be discussed in greater detail with reference to FIG. 2, the present invention is activated and initialized when the computer 102 receives a reset signal. This reset signal may be initiated in one of four ways, namely, activation of a reset switch (not shown), turning on via an on/off switch 104, by enabling a sequence of keys, such as CTRL-ALT-DEL, on the keyboard 105, or through a power surge or interruption (not shown). Lastly, the computer 102 includes an externally-readable indicator 103 which, in a preferred embodiment of the present invention, is a light-emitting diode ("LED").

Figure 2:
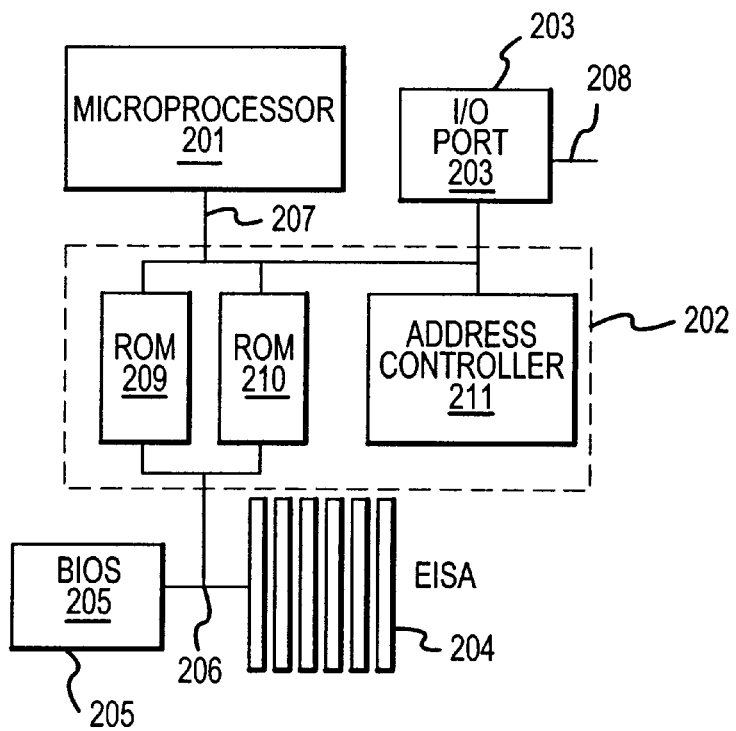
FIG. 2 illustrates a block diagram of the architecture of the personal computer of FIG. 1 embodying the present invention.

Turning now to FIG. 2, illustrated is a block diagram of the architecture of the personal computer of FIG. 1 embodying the present invention. In a preferred embodiment, a microprocessor 201 is coupled to a bus controller 202 via a host bus 207. The host bus 207 is capable of transmitting address and data signals at a relatively high speed. An input/output-indicator port 203 is also coupled to the host bus 207.

The purpose of the input/output-indicator port 203 is to provide a mode for allowing the host bus 207 to provide signals to the externally-readable indicator 103 of FIG. 1, such as an LED, over the bus 208. In its preferred embodiment, the present invention does not use the monitor 101 to indicate microprocessor status to the user for reasons addressed above.

The bus controller 202 is also attached to an I/O bus 206. The I/O bus 206, in contrast to the host bus 207, is only capable of transmitting address and data signals at relatively low speeds. Also attached to the I/O bus 206 are a BIOS ROM 205 and a series of EISA slots 204 adapted to receive EISA daughter cards therein. The BIOS ROM 205 is comprised of several individual ROM chips coupled together to provide permanent storage for the computer system's POST and BIOS instructions.

Although the bus controller 202 comprises other components that are not illustrated for the purposes of this discussion, components shown are ROMs 209, 210 and an address controller 211. The ROMs 209, 210 are responsible for storing both diagnostics instructions for use in the present invention, as well as bus management instructions, as is conventional in bus controllers.

As can be seen in FIG. 2, the bus controller 202 is coupled between the host bus 207 and the I/O bus 206. In a preferred embodiment of this invention, the bus controller 202 is responsible for managing all communication of address and data signals between the host bus 207 and the I/O bus 206.

In a preferred embodiment of the present invention, the microprocessor 201 receives a reset signal, as discussed in conjunction with FIG. 1, which instructs the microprocessor 201 to boot. The microprocessor 201, which is capable of retrieving POST and BIOS instructions from the BIOS ROM 205 via the host bus 207, the memory controller 202 and the I/O bus 206, respectively, sends an initial request to retrieve POST and BIOS instructions from the BIOS ROM 205. A diagnostic circuit comprising the ROMs 209, 210 and the address controller 211 within the bus controller 202 intercepts this initial request and provides the microprocessor 201 with diagnostic instructions stored in the ROMs 209, 210 in lieu of the requested POST and BIOS instructions, that, when executed by the microprocessor 201, indicate whether the microprocessor 201 and the host bus 207 are functioning properly, via the indicator port 203 and the externally-readable indicator 103 of FIG. 1 via the local bus 208. The manner in which the instruction is intercepted is detailed in Appendix A, attached hereto and detailed below. The diagnostic circuit then disables itself such that it does not intercept subsequent requests from the microprocessor 201. In other words, diagnostic circuit enters into a dormant state with respect to subsequent requests to thereby allow the microprocessor 201 to boot by accessing subsequent POST and BIOS instructions from the BIOS ROM 205.

One of the ways to practice the present invention is to place the interception and substitution circuit within the CPU itself; it is certainly within the scope of the present invention to do so. However, in a preferred embodiment of the present invention, the circuit is external to the CPU and, in fact, resides within the bus controller. This arrangement eliminates the need to redesign the CPU to include the circuit and allows the circuit to be processor-independent. Therefore the circuit and method of the present invention can operate with any CPU type, intercepting and substituting a diagnostic instruction particular to the CPU directing it to externally display, for the benefit of a user, whether the CPU is functioning properly.

When the CPU is initially turned on ("booted") or is reset after it has been turned on ("rebooted"), it is designed to issue requests to retrieve (or "fetch") instructions from BIOS POST to begin its initialization. In a preferred embodiment of the present invention, the interception and substitution circuit operates with respect to the initial request. Instead of passing this initial request on to BIOS POST, the interception and substitution circuit, residing within the bus controller and thus in the path of this initial request, detects and intercepts the initial request and substitutes, in lieu of the requested instruction from BIOS POST, a substituted diagnostics instruction. The CPU retrieves and executes this substituted diagnostics instruction without knowing that a substitution has occurred. The present invention is therefore transparent to the CPU.

The requested instruction, had the I/O bus or BIOS POST ROM itself been nonfunctional, would never have been available to the CPU for execution if the instruction was stored in BIOS POST ROM. It is within the scope of the present invention to operate with respect to a subsequent request by the CPU, instead of the initial request. It simply makes more sense to intercept the initial request, before the CPU has an opportunity to encounter a fault that prevents BIOS POST from loading.

The present invention preferably locates the interception and substitution circuit within the bus controller, the bus controller coupled to the CPU via a host bus and coupled to the memory via an I/O bus, the bus controller managing communication of address and data signals between the host bus and the I/O bus. This places the bus controller strategically in the path between the CPU and the BIOS ROM containing POST routines. Thus, the interception circuit is in a good position to intercept the CPU's requests. Furthermore, since the bus controller already contains ROM for purposes of bus management, this ROM is used to store the substituted diagnostic instruction in a preferred embodiment of the present invention.

The externally-readable indicator can be an LED that the CPU activates to provide a simple indication of functionality. An alternative to providing a LED as an indicator is to provide a diagnostics coprocessor coupled to the main bus. The diagnostics coprocessor is designed to gather information concerning system operation and to report that information to a user. In this case, the present invention enables the CPU to provide information regarding its functionality to the diagnostics coprocessor. A general discussion of diagnostics coprocessors is beyond the scope of the present invention.

As previously discussed, a preferred embodiment of the present invention includes a reset circuit coupled to the CPU and capable of causing the CPU to boot. On a personal computer, this circuit can be the power switch, a dedicated reset button or a particular key combination, entered via a keyboard coupled to the CPU, perhaps the familiar "CTRL-ALT-DEL" CPU reset command.

Once the interception and substitution circuit has provided its substituted alternative diagnostic instruction to the CPU, the circuit goes dormant, allowing the CPU to proceed by retrieving subsequent instructions from POST ROM, thus continuing its boot procedure. The operation of the circuit is designed to be transparent to the CPU, not only while it is functioning, but also after it becomes dormant. Thus, the CPU needs no hardware or microcode modifications to operate in conjunction with the present invention and, as will be shown later, the present invention can be adapted to operate in conjunction with a variety of different CPU types. Further, the computer system as a whole needs no software modifications, as the present invention is software-transparent.

Figure 3:
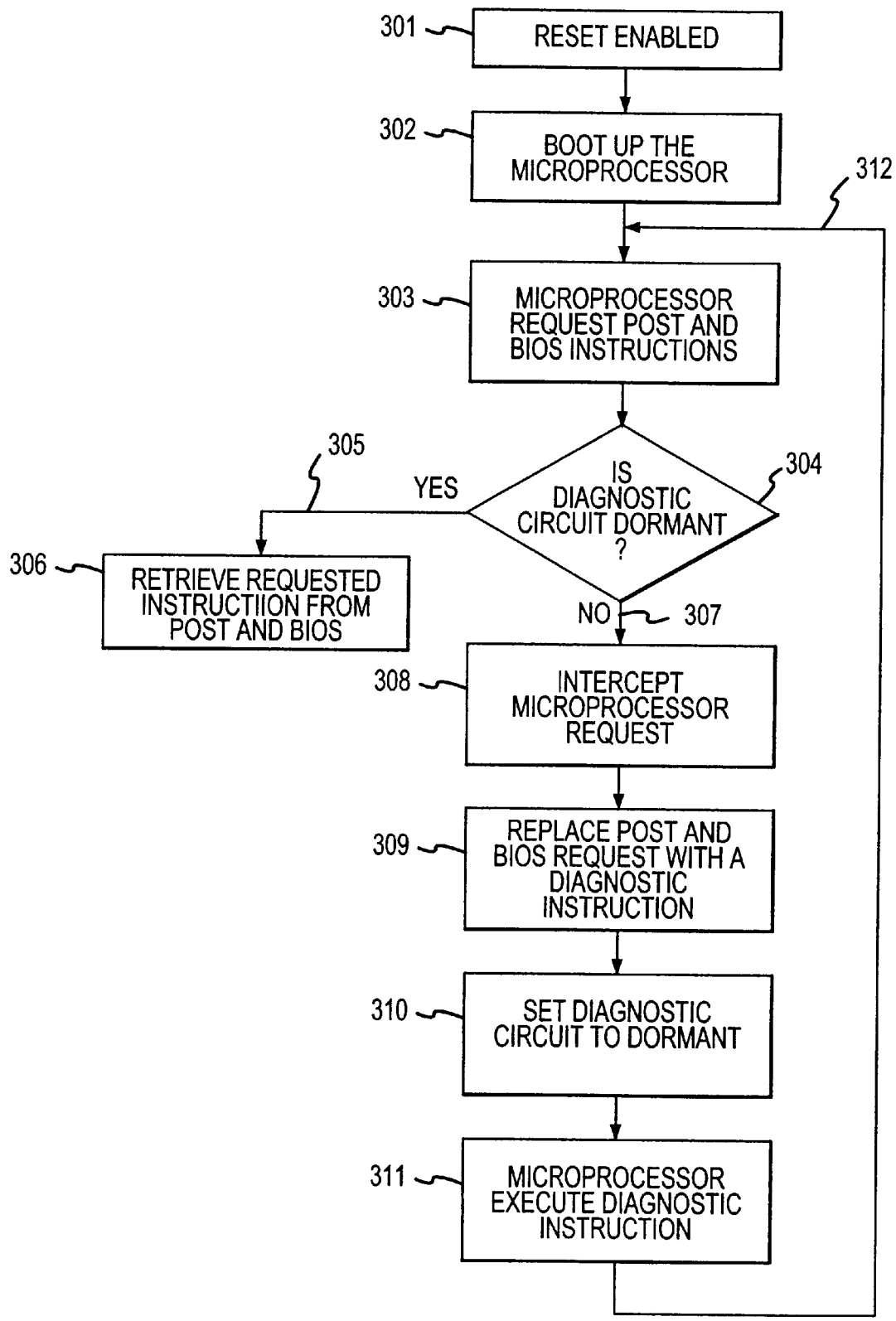
FIG. 3 illustrates a flow diagram of the method of the present invention carried out in the architecture of FIG. 2.

Turning now to FIG. 3, illustrated is a flow diagram of the method of the present invention carried out in the architecture of FIG. 2. Upon receipt of a reset enabling signal (block 301) via one of the modes discussed in conjunction with FIG. 1, microprocessor 201 of FIG. 2 begins to boot (block 302). Microprocessor 201 issues a retrieve-instruction (or fetch) command for power-on self-test (POST) and basic input/output system (BIOS) instructions (block 303) stored within the BIOS ROM 205 of FIG. 2 in the computer system, itself coupled to the bus controller 202 of FIG. 2 by the relatively slow I/O bus 206 of FIG. 2. The bus controller 202 also is coupled to the microprocessor 201 by faster host bus 207 of FIG. 2. The bus controller 202 is charged with managing all communication of address and data signals between the host bus 207 and the I/O bus 206.

As the retrieve-instruction command passes through the bus controller 202 from the host bus 207 to the I/O bus 206, the bus controller 202 determines whether a diagnostic circuit within the bus controller 202 is disabled, i.e., set to dormant (decisional block 304). The manner in which the diagnostic circuit is disabled is detailed in Appendix A, attached hereto and detailed below. A positive determination that the diagnostic circuit is in fact dormant indicates that the diagnostic circuit has already run and the microprocessor 201 has been deemed functional. In such a case (path 305), the bus controller 202 retrieves the requested POST and BIOS instruction (block 306).

If the bus controller 202 should make a negative determination (path 307) that the diagnostic circuit is dormant, the bus controller 202 will allow the diagnostic circuit to intercept the retrieve-instruction command issued by the microprocessor 201 (block 308), the circuit substituting, in lieu of the requested POST and BIOS instruction, a diagnostic instruction stored in the ROMs 209, 210 of FIG. 2 (block 309).

The bus controller 202 then renders the diagnostic circuit dormant with respect to subsequent requests to thereby allow the microprocessor 201 to boot by subsequently retrieving the POST and BIOS instructions (block 310).

The microprocessor 201 executes the substituted diagnostic instruction, causing the microprocessor 201 to externally indicate whether the microprocessor 201 and the host bus 207 are functioning properly (block 311). This indication is made through the externally-readable indicator 103 of FIG. 1 coupled to the host bus 207 via the indicator port 203 of FIG. 2. Execution proceeds along path 312.

The microprocessor 201 issues a subsequent retrieve-instruction command for a POST and BIOS instruction (the block 303) and, at the decisional block 304, the bus controller 202 follows the positive path 305, satisfying the microprocessor's request (block 306).

The present invention is embodied in a chip or chip set that comprises the connection between the host bus and the I/O bus, that in most personal computers is an EISA channel or bus. This chip or chip set is acts as the buffer between the relatively fast host bus and the relatively slow I/O bus. One ordinarily skilled in the art can independently design logic to operate within the bus controller 202 given the flow diagram of FIG. 3. Attached hereto as Appendix A is a source code listing of the present invention in the VHDL silicon compiler language. One ordinarily skilled in the art should realize that Appendix A, when processed through a silicon compiler, will yield a design for a bus controller embodying the present invention.

This chip or chip set functions as an interception and substitution circuit, intercepting one of several initial fetches from the CPU following a reset enable signal, and substituting the fetch with a small number of executable codes which instruct the CPU to perform a predetermined function indicating that the CPU is functioning properly. The executable codes are embedded into a small ROM within the data path of the bus controller, providing the first sequence of instructions for the booting CPU. Again, a preferred embodiment of the invention calls for the executable codes to direct the CPU to instruct an I/O port (indicator port) coupled to the host bus to turn on or off an LED or set a value that a diagnostics coprocessor can read indicating that the CPU is functioning properly. By providing the code from the data path between the host bus and the I/O bus, the host bus can be isolated from the I/O bus.

A reasonable code sequence can be implemented in 8 bytes. This corresponds to the bus width for two data path chips within the bus controller. The decode for these data path chips can be either on the first CPU request or by means of the bus controller address chip providing a decode for the boot address of the CPU.

The present invention allows minimal boot detection of a functioning CPU without the need for extra boot ROMs. Boot ROMs implemented on a 64 bit bus without byte-shifting is costly because of the need to add 8 ROMs or 8 buffers to byte-shift one ROM and adds needless hardware complexity. Furthermore, the added ROMs would add a load to the host bus, which is highly undesirable.

In the event of a fault that prevents POST from loading and executing, prior art systems would appear to the user to be frozen. But, with the present invention in place, the user has an indication of the problem. If the indicator LED is lit, the user knows that the CPU operated correctly to fetch and execute the diagnostic code from the bus controller. Thus, the problem must be in the I/O bus or its attachments. On the other hand, if the indicator is not lit, the user can assume that the problem is with the host bus, the bus controller or the CPU itself.

It is important to note that the diagnostic instructions need not be stored in ROM within the bus controller. The code could be stored elsewhere, as the interception and substitution circuit could be separate from the bus controller. Furthermore, the code could be stored in RAM and loaded from an external source. The code could also be hardwired.

Although the present invention is disclosed in the environment of the personal computer, those skilled in the art should realize that the present invention is equally applicable to larger computers and is not limited to personal computer bus and processor architectures disclosed herein. The essence of the present invention is its ability to isolate faults to a region proximate the CPU: its increased resolution.

From the above, it is apparent that the present invention is the first to provide, in a computer system including a CPU capable of issuing a signal to a memory to retrieve a requested instruction from the memory when the CPU is booted, a means for localizing faults within the computer system, comprising an interception and substitution circuit, coupled to the CPU, capable of intercepting the signal and providing an alternative instruction to the CPU in lieu of the requested instruction, the alternative instruction providing an indication of proper functioning of the computer system when executed by the CPU.

Although the present invention and its advantages have been described in detail, it should be understood that various changes, substitutions and alterations can be made herein without departing from the spirit and scope of the invention as defined by the appended claims.

What is claimed is:

1. In a computer system including a central processing unit ("CPU") capable of issuing a signal to a memory to retrieve a requested instruction from said memory when said CPU is booted, a circuit, transparent to said CPU, capable of localizing faults within said computer system, comprising:
an interception and substitution circuit, coupled to said CPU, capable of intercepting said signal and providing an alternative instruction to said CPU in lieu of said requested instruction, said alternative instruction directing said CPU to perform a diagnostic check of said computer system, said CPU providing an indication of proper functioning of said computer system, said CPU requiring no hardware modifications to operate in conjunction with said interception and substitution circuit.

2. The system as recited in claim 1 further comprising a host bus coupling said CPU to said interception and substitution circuit.

3. The system as recited in claim 1 further comprising an I/O bus coupling said memory to said interception and substitution circuit.

4. The system as recited in claim 1 wherein said interception and substitution circuit forms a part of a bus controller, said bus controller coupled to said CPU via a host bus and coupled to said memory via an I/O bus, said bus controller managing communication of address and data signals between said host bus and said I/O bus.

5. The system as recited in claim 1 further comprising an indicator port coupled to said CPU via a host bus, said indicator port allowing said host bus to provide signals to an externally-readable indicator coupled to said indicator port.

6. The system as recited in claim 1 wherein said memory stores power-on self-test (POST) and basic input/output system (BIOS) instructions.

7. The system as recited in claim 1 further comprising a reset circuit coupled to said CPU and capable of causing said CPU to boot.

8. The system as recited in claim 1 wherein said interception and substitution circuit intercepts an initial signal from said CPU to said memory.

9. The system as recited in claim 1 wherein said interception and substitution circuit becomes dormant after intercepting said signal and substituting said alternative instruction.

10. The system as recited in claim 1 wherein said alternative instruction is a diagnostics instruction.

11. A method of diagnosing a fault in a computer system, comprising the steps of:

transmitting a signal from a central processing unit ("CPU") to a memory when said CPU is booted, said signal representing a request to retrieve a requested instruction from said memory; and intercepting said signal with a circuit ouparent to said CPU, said circuit providing an alternative instruction to said CPU in lieu of said requested instruction, said alternative instruction directing said CPU to perform a diagnostic check of said computer system, said CPU providing an indication of proper functioning of said computer system, said CPU requiring no hardware modifications to operate in conjunction with said circuit.

12. The method as recited in claim 11 further comprising the step of providing a boot signal to said CPU to boot said CPU.

13. The method as recited in claim 11 wherein said requested instruction is a power-on self-test (POST) instruction.

14. The method as recited in claim 11 wherein said memory is read-only memory (ROM).

15. The method as recited in claim 11 wherein said CPU is coupled serially to said memory via a host bus, a bus controller and an I/O bus.

16. The method as recited in claim 11 wherein said step of intercepting is performed by a diagnostic circuit within a bus controller coupled to said CPU.

17. The method as recited in claim 11 wherein said alternative instruction is a diagnostic instruction stored in read-only memory (ROM) within a bus controller coupled to said CPU.

18. The method as recited in claim 11 further comprising the step of executing said alternative instruction in said CPU, said alternative instruction causing said CPU to externally indicate whether said CPU and a host bus coupled to said CPU are functioning properly via an externally-readable indicator coupled to said host bus via an indicator port.

19. The method as recited in claim 11 further comprising the step of rendering said circuit dormant with respect to subsequent requests to thereby allow said computer system to boot by retrieving requested instructions.

20. A diagnostics system for diagnosing a fault in a computer system, comprising:

a bus controller coupled between a first bus and a second bus and capable of managing communication of signals between said first bus and said second bus;

a memory, coupled to said second bus, capable of storing boot instructions;

a central processing unit (CPU), coupled to said first bus, capable of issuing a signal over said first bus to fetch a requested one of said boot instructions from said memory unit when said CPU is booted; and a circuit, transparent to said CPU, within said bus controller capable of intercepting said signal and providing, in lieu of said requested one of said instructions, a diagnostic instruction that provides an external indication of whether said CPU is functioning properly when said CPU executes said diagnostic instruction no hardware modifications to operate in conjunction with said circuit.

21. The diagnostics system as recited in claim 20 wherein said bus controller manages communication of address and data signals between said host bus and said I/O bus.

22. The diagnostics system as recited in claim 20 further comprising an indicator port coupled to said CPU via said first bus, said indicator port allowing said first bus to provide signals to an externally-readable indicator coupled to said indicator port.

23. The diagnostics system as recited in claim 20 wherein said boot instructions comprise power-on self-test (POST) and basic input/output system (BIOS) instructions.

24. The diagnostics system as recited in claim 20 further comprising a reset circuit coupled to said CPU and capable of causing said CPU to boot.

25. The diagnostics system as recited in claim 20 wherein said circuit intercepts an initial signal from said CPU to said memory unit.

26. The diagnostics system as recited in claim 20 wherein said circuit becomes dormant after intercepting said signal and providing said alternative instruction.

27. The diagnostics system as recited in claim 20 wherein said alternative instruction is a diagnostics instruction.

28. A diagnostics system for diagnosing a fault in a computer system, comprising:

a host bus capable of transmitting address and data signals at a relatively high speed;

an I/O bus capable of transmitting address and data signals at a relatively low speed;

a bus controller coupled between said host bus and said I/O bus, said bus controller managing communication of address and data signals between said host bus and said I/O bus and including bus controller memory for storing bus management instructions;

an indicator port coupled to said host bus, said indicator port allowing said host bus to provide signals to an externally-readable indicator;

read-only memory (ROM) coupled to said I/O bus, said ROM storing power-on self-test (POST) and basic input/output system (BIOS) instructions;

a microprocessor coupled to said host bus, said microprocessor capable of retrieving said POST instructions from said ROM via said host bus, said bus controller and said I/O bus in series;

a reset circuit capable of causing said microprocessor to boot, said microprocessor sending an initial request to retrieve one of said POST instructions from ROM; and a diagnostic circuit, transparent to said microprocessor, within said bus controller capable of intercepting said initial request and providing to said microprocessor, in lieu of said one of said POST instructions, a diagnostic instruction stored in said bus controller memory, that, when said microprocessor executes said diagnostic instruction, indicates whether said microprocessor and said host bus are functioning properly via said indicator port and said externally-readable indicator, said diagnostic circuit dormant with respect to subsequent requests to thereby allow said computer system to boot, said microprocessor requiring hardware modifications to operate in conjunction with said diagnostic circuit.

29. The diagnostics system as recited in claim 28 wherein said externally-readable indicator is a light-emitting diode (LED) on a front panel of said computer system.

30. The diagnostics system as recited in claim 29 wherein said diagnostic instruction activates said LED.

31. A method of diagnosing a fault in a computer system, comprising the steps of:

booting a microprocessor within a computer system;

issuing a retrieve instruction command from said microprocessor to retrieve a POST instruction from a read-only memory (ROM) within said computer system, said microprocessor coupled serially to said ROM via a host bus, a bus controller and an I/O bus;

intercepting said retrieve instruction command with a diagnostic circuit, transparent to said microprocessor, within said bus controller, said diagnostic circuit substituting, in lieu of said POST instruction, a diagnostic instruction stored in said bus controller memory;

executing said diagnostic instruction in said microprocessor, said diagnostic instruction causing said microprocessor to externally indicate whether said microprocessor and said host bus are functioning properly via an externally-readable indicator coupled to said host bus via an indicator port; and rendering said diagnostic circuit dormant with respect to subsequent requests to thereby allow said computer system to boot by retrieving said POST instructions, said microporcessor requiring no hardware modifications to operate in conjunction with said diagnostic circuit.

32. The method as recited in claim 31 wherein said externally-readable indicator is a light-emitting diode (LED) on a front panel of said computer system.

33. The method as recited in claim 32 wherein said diagnostic instruction activates said LED.

* * * * *